United States Patent [19]
Naz

[11] Patent Number: 5,078,654
[45] Date of Patent: Jan. 7, 1992

[54] CHAIN PIN LUBRICATOR SYSTEM

[75] Inventor: Paul A. Naz, Port Huron Township, St. Clair County, Mich.

[73] Assignee: Wilkie Brothers Conveyors, Inc., Marysville, Mich.

[21] Appl. No.: 588,279

[22] Filed: Sep. 26, 1990

[51] Int. Cl.⁵ .......................................... F16G 13/02
[52] U.S. Cl. .................................................. 474/91
[58] Field of Search ................ 474/91, 43; 184/15.1; 198/500; 305/14

[56] References Cited

U.S. PATENT DOCUMENTS 2,159,396  5/1939  Miller et al. ................ 474/91 X
2,336,913 12/1943  Albrecht ........................ 474/91

Primary Examiner—Thuy M. Bui
Attorney, Agent, or Firm—Harness, Dickey & Pierce

[57] ABSTRACT

A center link for a rivetless chain has a reservoir and lubricator for holding and distributing lubricant to connector pins between adjacent center links and side bars. The reservoir and distributor are integrally formed with the central link to provide lubricant to the pins.

8 Claims, 2 Drawing Sheets

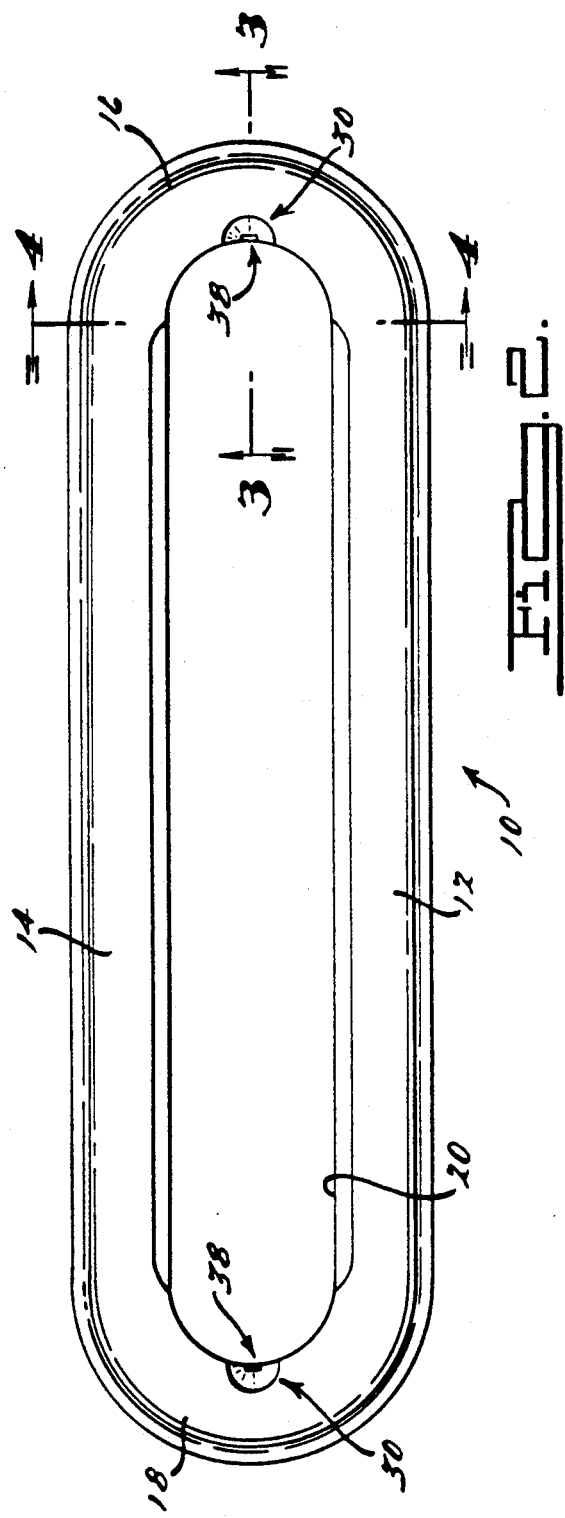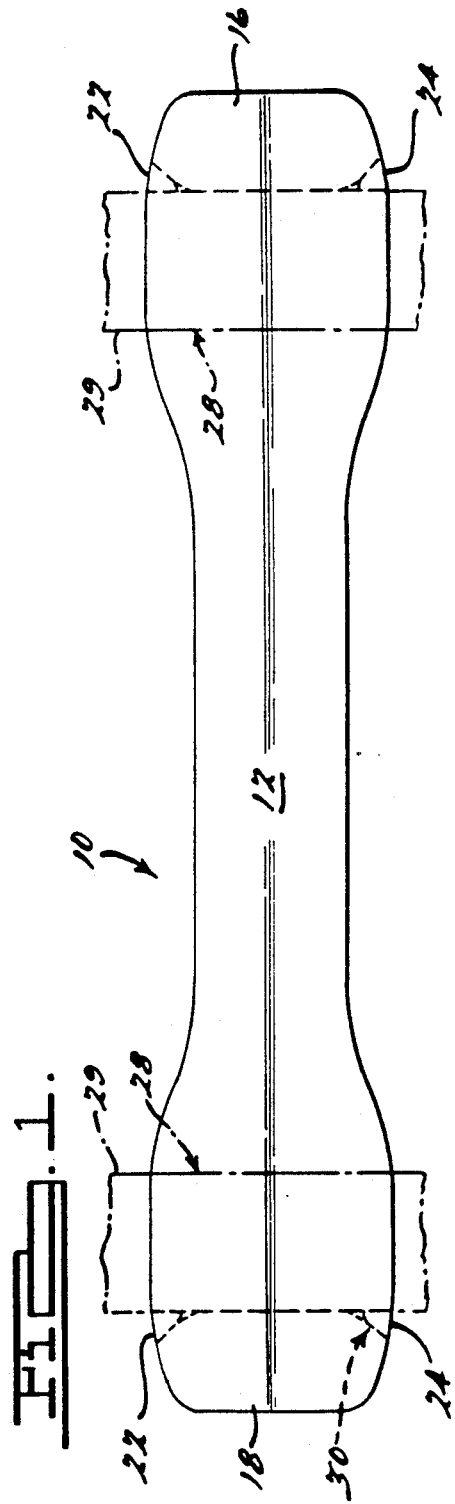

CHAIN PIN LUBRICATOR SYSTEM

BACKGROUND OF THE INVENTION

The present invention relates to a rivetless conveyor chain and, more particularly, to a lubricator for pins connecting adjacent links of the rivetless conveyor chain.

The original rivetless chain was the subject matter of U.S. Pat. No. 870,704, Nov. 12, 1907, to Weston. The chain which was the subject matter of the Weston patent is invariably referred to as "keystone", "rivetless" or "Weston" chain and has had wide application in conveyor, mining machinery and other industrial uses. Rivetless chain is strong, adaptable as a sprocket chain, and subject to lengthening or shortening by manually adding or removing individual links of the chain.

Generally speaking, rivetless chains consist of alternating units of central links and pairs of side bars joined together by headed pins. Each center link consists of an individual piece of metal having a pair of laterally spaced side walls joined at their end by curved end walls, the side walls and end walls enclosing or surrounding an elongated slot. A pair of side bars, each having an elongated slot at each end, is pivotally connected to each end of each center link by headed pins, each pin having a transverse head on each end thereof similar to the headed end of a "T" head machine bolt. The side bars are formed at their ends with transversely extending recesses on their outer faces in which the heads of the pins are seated to lock the pin in position after the center links and side bars have been coupled together. Each of the center links has a narrow central portion which tapers outwardly adjacent to the ends of the link to form thickened portions at the link ends. When the center links and side bars are assembled by means of the headed pins to form a chain, its side bars and center links are arranged in alternate relationship along the chain, each center link having connected to each end thereof a pair of face side bars and each such pair of side bars being connected at each end to an adjacent center link and so that pivotal movement is permitted between the adjacent center links and side bars about the center of headed pin as an axis.

An improved rivetless chain is disclosed in U.S. Pat. No. 2,507,025, May 9, 1950, to Lemmon, which is directed to a center link for rivetless chains having thickened end portions with convexly curved upper and lower faces and a central portion, the upper and lower faces of which are also convexly curved, the curved end portions and central portion of the link being connected by reentrance concave surfaces which merge gradually with the end and central portions without the formation of any sharp lines or demarkation or cleavage. The improved center links set forth in the Lemmon patent are commonly used today, and the present invention is particularly well adapted to be associated with rivetless chains having such improved center links.

The specifications of both the aforementioned Weston and Lemmon patents are specifically incorporated by reference herein.

To extend the life of the chain, increase durability and provide a smoother running conveyor chain, it is desirable to lubricate the connector pin bodies at each link junction. Automatic lubrication systems for chain pins are commercially available. One such device is sold under the trademark "Lubtronics". This type of lubricator provides a desired amount of lubricant at the pin area between adjacent connected links. However, due to the convexity and flatness of the Lemmon and Weston center links at the connector pin junctions, the lubricant generally rolls off the outside surface of the links and does not lubricate the pin. Thus, it is desirable to have a mechanism which is associated with the links which provides the connector pin bodies with lubricant.

Accordingly, it is an object of the present invention to provide lubricant to connector pins of a rivetless conveyor chain. The present invention provides the art with a reservoir and distribution mechanism for receiving and distributing lubricant from a lubricating device to the body of the connector pin. Ordinarily, the reservoir and distributing mechanism are integrally formed with the center link of the rivetless chain.

From the following detailed description taken in conjunction with the accompanying drawings and subjoined claims, other objects and advantages of the present invention will become apparent to those skilled in the art.

BRIEF DESCRIPTION OF THE DRAWINGS

FIG. 1 is a side elevation view of a center link for a Weston or keystone chain in accordance with the principles of the present invention.

FIG. 2 is a plan view of the structure shown in FIG. 1.

DETAILED DESCRIPTION OF THE PREFERRED EMBODIMENT

Figure 3:
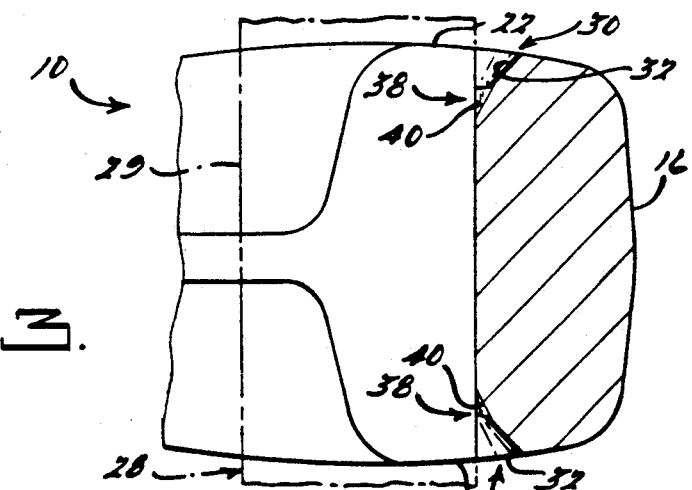
FIG. 3 is an enlarged sectional detail taken of FIG. 2 on the Line 3—3 thereof.

Turning to the FIGURES, particularly FIGS. 1 and 2, a forged center link is illustrated and designated with the reference numeral 10. The link 10 is of the general form of a flat bar-like structure formed into an elongated link having side walls 12 and 14 and curved end wall sections 16 and 18 which enclose an open elongated slot 20. The link 10 is of a symmetrical construction in that both halves of the link considered either from a transverse central plane or a longitudinal central plane are identical in configuration.

As best seen in FIG. 1, the top and bottom faces of the link adjacent to the curved sections 16 and 18 are provided with a convex curvature as indicated by reference numerals 22 and 24. The purpose of this curvature is to provide a rounded surface upon which the inner faces of the adjacent side links of the chain bare so that when the chain is passing around a vertical curve or bend in the conveyor's line of travel, relative movement between the side bars and the ends of the center links may occur without undue binding or cramping such as would occur if the top and bottom surfaces of the thickened end portions of the center link were flat and in relative close contacting engagement with the flat interfaces of the side bars. These convex surfaces, curving away from the interior surface of the center link like those illustrated in the Lemmon patent, have tended to direct the lubricant away from the connecting pins and onto the exterior surface of the link.

Figure 4:
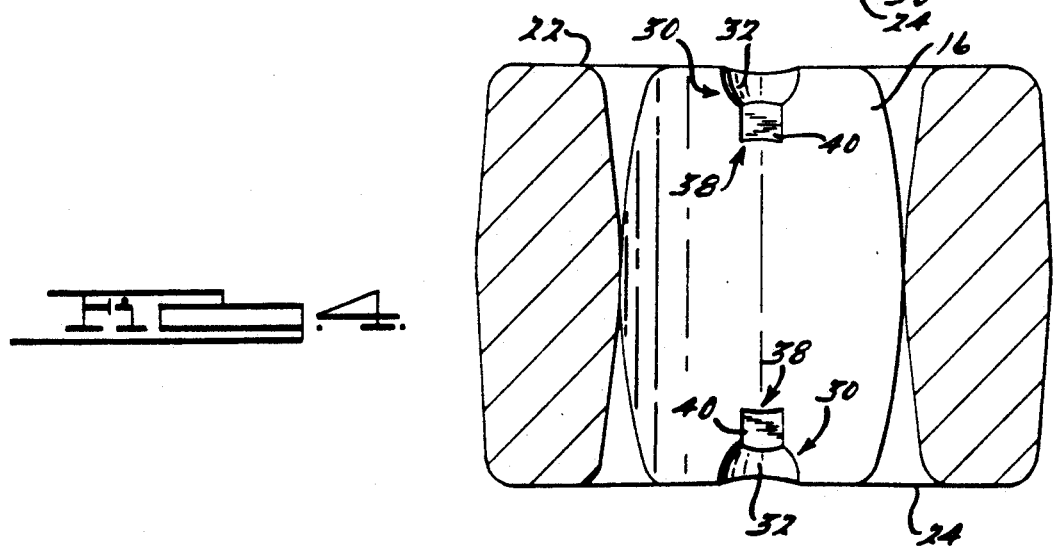
FIG. 4 is a similar enlarged cross-sectional detail taken of FIG. 2 along the Line 4—4 thereof.

A reservoir 30 is integrally formed into the top and bottom face of the link 10, at the curved end wall portions 16 and 18, as best seen in FIG. 2. The reservoirs 30 are designed to accept a desired amount of lubricant from a lubricant source to hold lubricant which is to be distributed to the connector pins 28. Ordinarily, the reservoirs 30 are impressions in the curved end wall portions having an arcuate concave surface 32 in the end wall portions 16 and 18, as seen in FIGS. 3 and 4. The reservoirs 30 may be of a desired size to hold the lubricant, however, the size is restricted by the size of the central link.

A distribution path 38 is formed in the curved wall portions 16 and 18 of the central link 10. The distribution path 38 provides lubricant from the reservoirs 30 to the body 29 of the connector pin 18. The distribution path 38 includes a surface 40 which is angled with respect to a central axis of the pin 28, as seen in FIGS. 3 and 4. The surface 40 extends from the link interior surface 42 to the reservoirs 30. The surface 40 enables lubricant to flow from the reservoir 30 to the pins 28. Also, the distribution path may be eliminated and enable the reservoir 30 to supply lubricant to the pin body 29.

Figure 5:
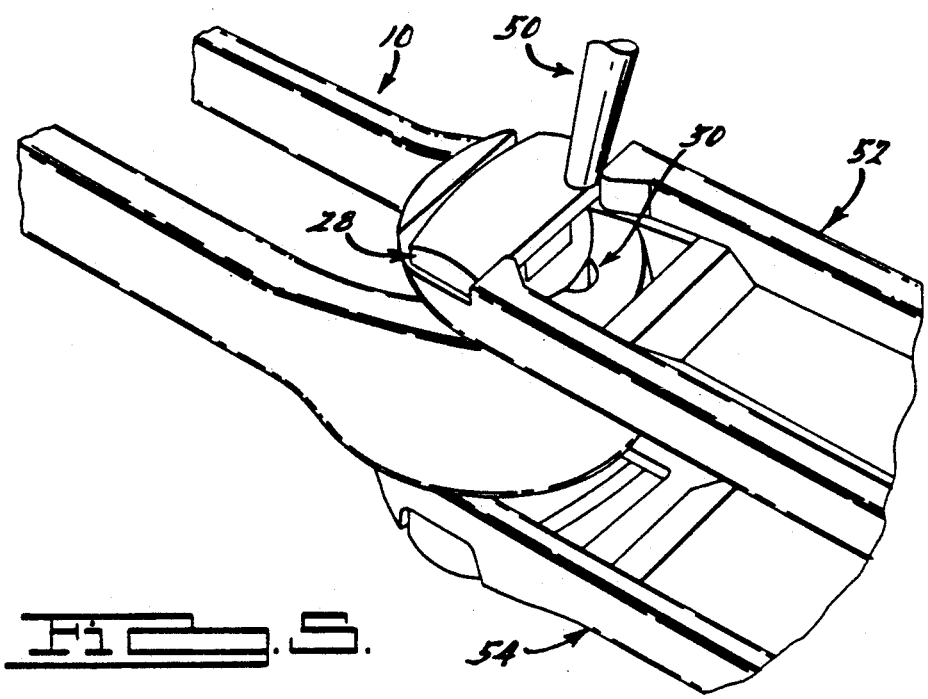
FIG. 5 illustrates a perspective view of a center link and side bar junction of a keystone chain embodying the present invention with a tip of an automatic lubricator device.

Moving to FIG. 5, a tip of a device for lubricating a chain in accordance with the present invention is illustrated and designated with the reference numeral 50. The central link 10 is shown as being attached to a pair of side bars 52 and 54 by pin 28. As the central link 10 passes under the lubricator 50, drops of lubricant are injected into the reservoir 30. As the chain continues to move along its path, the reservoir 30 and surface 40 distribute the lubricant to the body of the pin 28. Thus, the lubricant is directed from the top surface of the link into the interior portion of the link to lubricate the pin body. The lubricant provides the chain with increased life and durability as well as providing a smoother running rivetless conveyor chain.

While the above detailed description provides a preferred embodiment of the present invention, it will be understood that the present invention is susceptible to modification, alteration and change without deviating from the scope and fair meaning of the subjoined claims.

What is claimed is:

1. In a rivetless chain having alternating units of elongated center links and pairs of elongated side bars, with pairs of side bars straddling ends of center links and joined thereto by headed pins, each center link having a pair of laterally spaced elongated side walls and a pair of curved end walls, said side walls and end walls surrounding an elongated slot, each end wall having a concave face facing said elongated slot and top and bottom faces facing said side bars, each side bar having an elongated slot at each end and outer faces with transversely extending recesses therein, and each pin adapted to extend through the elongated slots of a center link and a pair of side links and having a transverse head on each end thereof which seats in the transversely extending recess of the associated side link to lock the position after the side bars and center link have been pivotally coupled together, the improvement wherein said chain has a lubricator system for conducting lubricant to pins of said chain, said lubricator system comprising an improved center link having at least one lreservoir in each of said curved end walls, each said reservoir being a recess in one of said top and bottom faces and in fluid communication with the exterior of said on face so as to be adapted to receive a supply of lubricant from an outside source, said lubricator system further having a pathway for directing lubricant from said reservoir to said pin, said pathway being a recess in said concave face of said end wall and being in fluid communication with said reservoir.

2. The improvement of claim 1 wherein said reservoir is a recess having decreasing diameter towards the interior of the center link.

3. The improvement of claim 2 wherein said recess comprises a concave surface formed in one of said top and bottom faces of said center link.

4. The improvement of claim 1 wherein the top and bottom faces of said center link have a convex curvature.

5. The improvement of claim 4 wherein said reservoir is a recess having decreasing diameter towards the interior of the center link.

6. The improvement of claim 5 wherein said recess comprises a concave surface formed in one of said top and bottom faces of said center link.

7. The improvement of claim 6 wherein said pathway has a triangular shape in longitudinal cross section.

8. In a rivetless chain having alternating units of elongated center links and pairs of elongated side bars, with pairs of side bars straddling ends of center links and joined thereto by headed pins, each center link having a pair of laterally spaced elongated side walls and a pair of curved end walls, said side walls and end walls surrounding an elongated slot in said center link, each end wall of said center link having a concave face facing said elongated slot and top and bottom convexly curved faces facing said side bars, each side bar having an elongated slot at each end and outer faces with transversely extending recesses therein, and each pin adapted to extend through the elongated slots of a center link and an associated pair of side links and having a transverse head on each end thereof which seats in the transversely extending recess of the associated side link to lock the pin in position after the side bars and center link have been pivotally coupled together, the improvement wherein said chain has a lubricator system for conducting lubricant to pins of said chain, said lubricator system comprising an improved center link having at least one reservoir in each of said curved end walls, each said reservoir being a recess in one of said top and bottom faces which has a decreasing diameter in a direction away from said one face of said center link, said recess being in fluid communication with the exterior of said one face so as to be adapted to receive a supply of lubricant from an outside source, said lubricator system further having a pathway for directing lubricant from said reservoir to said pin, said pathway being a recess in said concave face of said end wall and being in fluid communication with said reservoir.

* * * * *

UNITED STATES PATENT AND TRADEMARK OFFICE
CERTIFICATE OF CORRECTION

PATENT NO. : 5,078,654
DATED : January 7, 1992
INVENTOR(S) : Paul A. Naz

It is certified that error appears in the above-identified patent and that said Letters Patent is hereby corrected as shown below:

Column 3, line 16, "pin 18" should be --pin 28--

Col. 3, line 58, after "the" (2nd occurrence) insert --pin in--.

Column 4, line 2, claim 1, "1reservoir" should be --reservoir--

Column 4, line 5, claim 1, "on" should be --one--

Signed and Sealed this

Thirteenth Day of July, 1993

Attest:

MICHAEL K. KIRK

Attesting Officer

Acting Commissioner of Patents and Trademarks